Sept. 23, 1969    S. H. SMITH, JR    3,469,121
SUPERCONDUCTIVE POWER APPARATUS
Filed Oct. 21, 1964    3 Sheets-Sheet 1
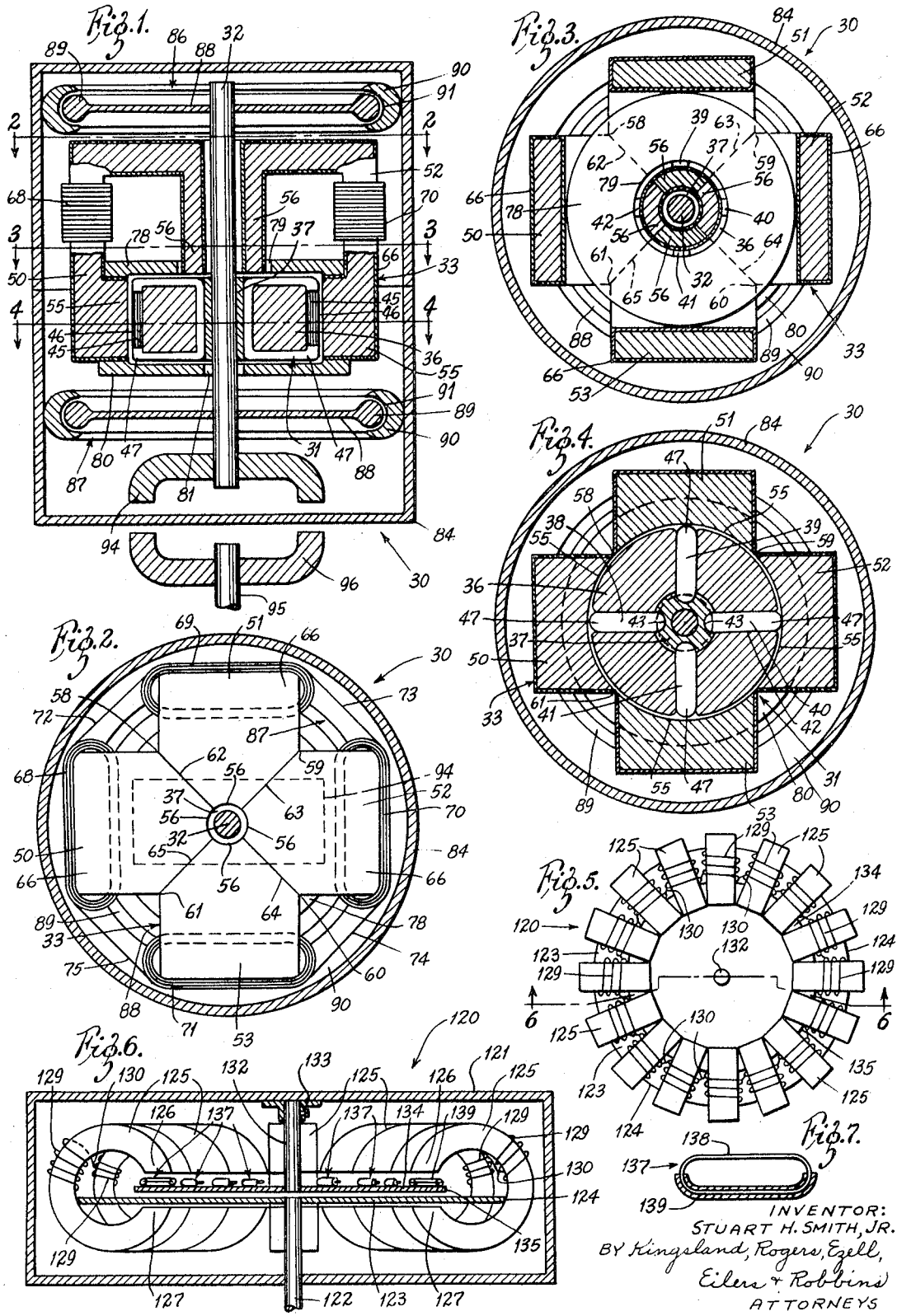
INVENTOR:
STUART H. SMITH, JR.
BY Kingsland, Rogers, Ezell,
Eilers & Robbins
ATTORNEYS

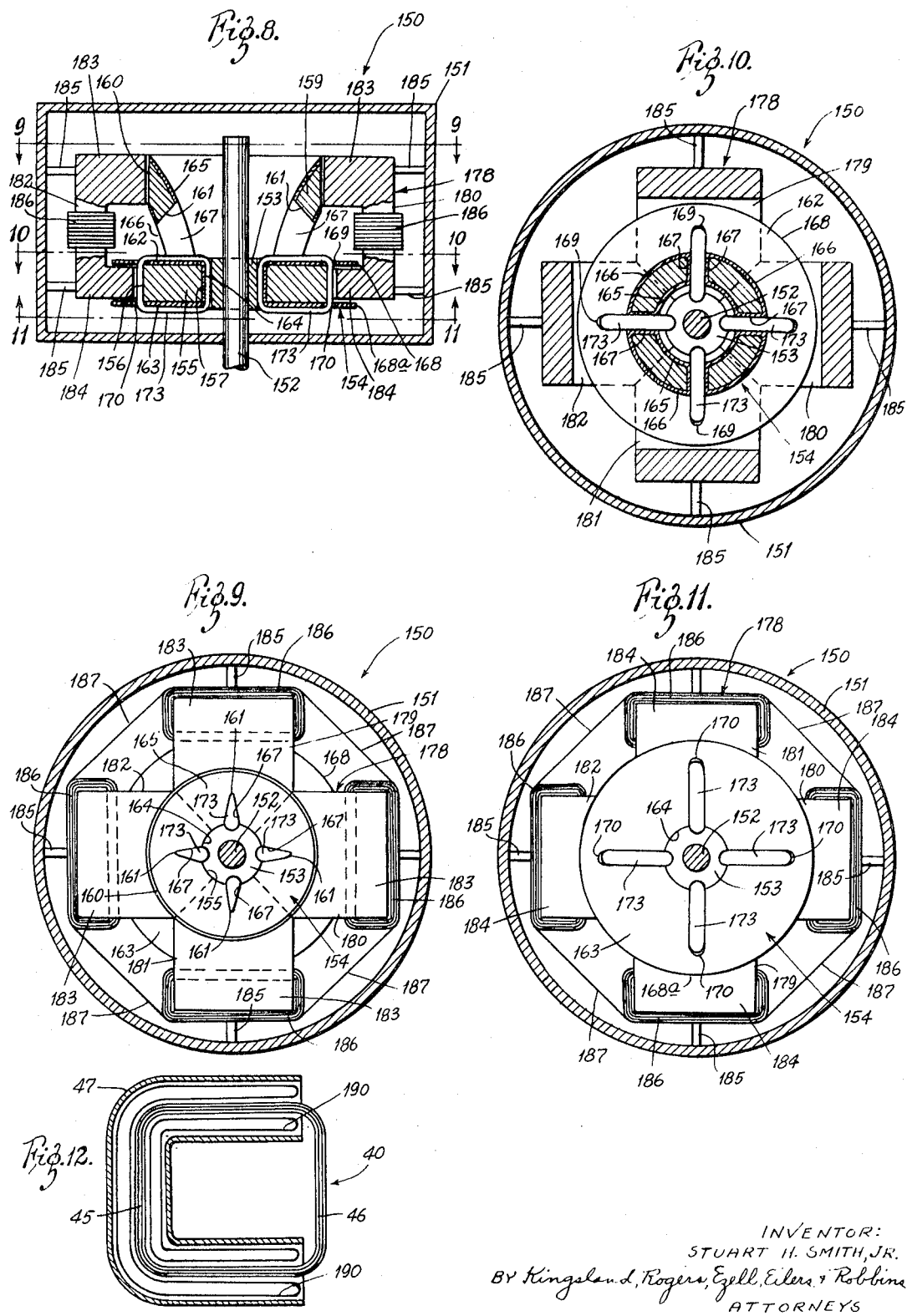

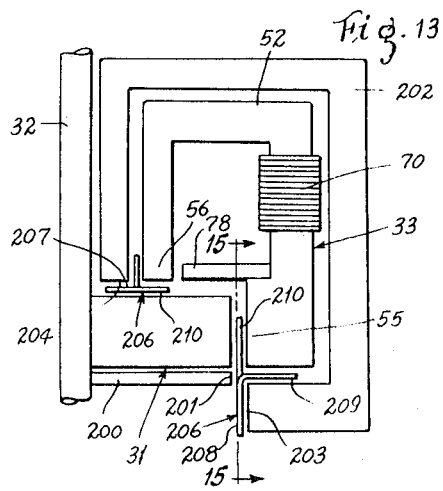
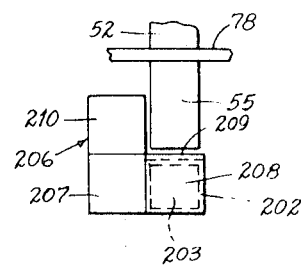
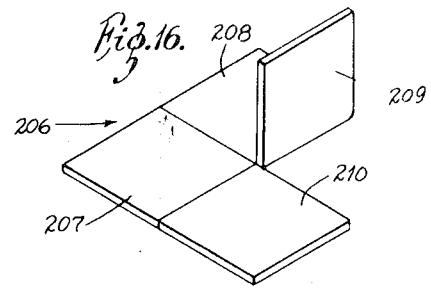
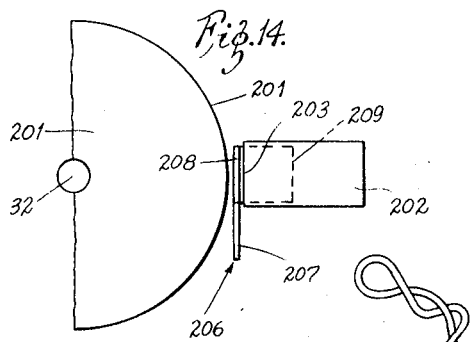
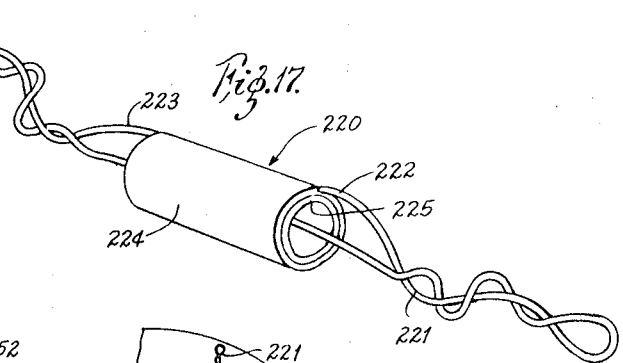
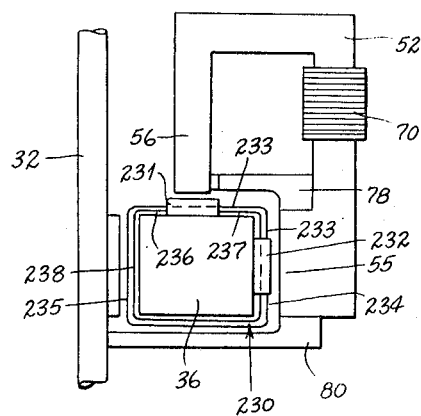
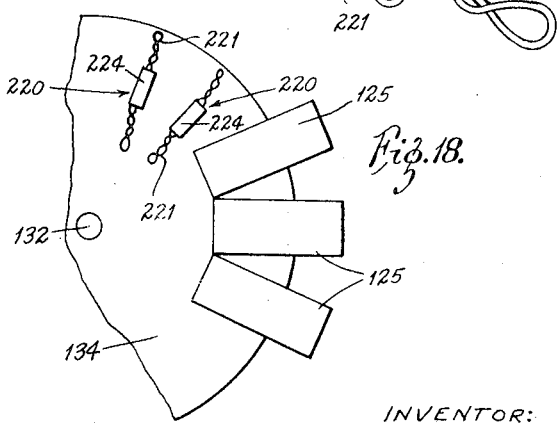

United States Patent Office 3,469,121
Patented Sept. 23, 1969

3,469,121
SUPERCONDUCTIVE POWER APPARATUS
Stuart H. Smith, Jr., 66 Briarcliff, Clayton, Mo. 63105
Filed Oct. 21, 1964, Ser. No. 405,393
Int. Cl. H02k 1/20, 3/48, 9/20
U.S. Cl. 310—10
16 Claims

ABSTRACT OF THE DISCLOSURE

A dynamoelectric machine to be operated at cryogenic temperatures having a stator providing a homopolar field and energized by coils carrying a persistent current is arranged to cooperate with a rotor having coils with at least two sides in the path of flux, at least one side being magnetically shielded by superconductive material. Embodiments of this arrangement include a motor in which the rotor coils are of superconductive material carrying a persistent current and a generator in which the rotor coils are of non-superconductive material.

---

This invention relates to power equipment incorporating principles of superconductivity, including electrical and magnetic properties that exist at very low temperatures. The possible uses of this invention include that of a DC motor, a DC generator operable by the motor, frictionless bearings between the moving parts, and various controls for the apparatus.

The following principles of superconductivity are useful in understanding this invention. At extremely low temperatures, electric current will flow without resistance through conductors made of certain materials. Examples of such superconductors are vanadium-gallium ($V_3Ga$) and niobium-tin ($Nb_3Sn$). Electric current carrying superconductors act as magnetic insulators until the strength of their own magnetic fields becomes sufficiently strong to break down the superconducting state. In fact, the ability of the superconductor to act as a magnetic insulator increases as the amount of current carried by the superconductor is decreased, and becomes a maximum when no current flows through the superconductor. The foregoing principles are known in the art. The methods of refrigerating superconducting materials to temperatures at which they will act as superconductors are also known in the art and are not of themselves, part of this invention.

In this invention, the power apparatus, such as a motor or a generator, has no brushes or commutator. For example, a DC motor made according to the teachings of this invention generally comprises a stator and a rotor entirely encased in a refrigerating enclosure kept refrigerated to superconducting temperatures. The stator has one or more cores made from a magnetic flux concentrating material with a coil of superconducting material wound around each core. The coil assembly comprises a plurality of closed loops or is one serially wound closed loop to the extent that there is no external current supplied to the coil assembly. Preferably, the stator cores surround the rotor, although these parts may be reversed. Each core has one pole adjacent the outer periphery of the rotor and the other pole opposite a radially inward point on the rotor. If more than one stator core is used, the cores are spaced around the rotor so that each core has its poles positioned as aforesaid. The coils wound around the cores are serially or separately wound as is desired. The coils are entirely independent of any outside power source once current has been introduced.

The rotor comprises a series of superconductive coils wound in loops around a disk-shaped cores. Magnetic flux present in the stator cores links the outer perimeter of the rotor windings with the adjacent poles on the stator cores. All but the outer perimeter portions of the rotor coils are surrounded by a superconducting tube of low current density or no current density, the tube therefore acting as a magnetic flux insulator. The rotor coil itself, however, carries current of high density, which creates a strong magnetic field that interacts, at the outer perimeter of the rotor, with the magnetic flux present in the stator.

Magnetic flux is produced at the outer perimeters of the rotor coils, but since the remaining parts of the rotor coils are flux insulated, no counter-torque is produced in the rotor at the radially inward poles of the stator cores. Consequently, without brushes or commutator, the motor operates.

The general object of this invention is to provide a power apparatus having a stator and a rotor with coils of superconductive materials to establish magnetic flux linking the stator and rotor. Another object is to provide superconductive flux insulation between selected parts of the stator and rotor to eliminate counter-torque.

Another object of the invention is to provide superconductive power apparatus of the stator-rotor type which operates without brushes or commutator, or sliding or interrupted electrical contact of any type.

Another object of the invention is to provide superconductive power apparatus having a stator and a rotor with superconductive low friction bearings for maintaining a desired position of the rotor while permitting it to rotate freely.

Other objects and advantages will appear.

In the drawings:

FIGURE 1 is a view in vertical section through the center of a motor incorporating principles of this invention;

FIGURE 2 is a view in section taken along the line 2—2 of FIGURE 1;

FIGURE 3 is a view in section taken along the line 3—3 of FIGURE 1;

FIGURE 4 is a view in section taken along the line 4—4 of FIGURE 1, with a plurality of superconductive coils being shown in elevation;

FIGURE 5 is a top plan of a generator incorporating principles of this invention, but with the thermal insulating enclosure removed;

FIGURE 6 is a view in section taken generally along the line 6—6 of FIGURE 5, and with the thermal insulating enclosure added;

FIGURE 7 is an enlarged view in medial section of a magnetic flux insulated stator coil loop used with the generator of FIGURES 5 and 6;

FIGURE 8 is a view in vertical section through the center of a modified form of motor;

FIGURE 9 is a view in section taken along the line 9—9 of FIGURE 8;

FIGURE 10 is a view in section taken along the line 10—10 of FIGURE 8;

FIGURE 11 is a view in section taken along the line 11—11 of FIGURE 8;

FIGURE 12 is an enlarged schematic sectional view through a rotor coil of the motor of FIGURE 1 showing a modification thereof;

FIGURE 13 is a schematic fragmentary side elevation view of the right side of the motor of FIGURE 1, but illustrating an output control for the motor;

FIGURE 14 is a schematic fragmentary bottom view of the motor of FIGURE 13;

FIGURE 15 is a view taken along the line 15—15 of FIGURE 13;

FIGURE 16 is an isometric view of the output control gate;

FIGURE 17 is an isometric view of another form of rotor coils;

FIGURE 18 is a fragmentary schematic top plan view of a motor showing how the coil of FIGURE 17 is used therewith; and FIGURE 19 is a fragmentary side elevation view of the right side of the motor of FIGURE 1, showing how the coil of FIGURE 17 is used therewith.

Referring to FIGURES 1–4, the motor 30 comprises a rotor or armature 31 mounted on an output or power shaft 32. A stator 33 surrounds the armature 31. The armature 31 comprises a paramagnetic core 36 mounted on an electrically insulating tube 37 of Monel metal or other electrically insulating material that in turn is mounted on the shaft 32.

A plurality of superconductive coils 38, 39, 40 and 41 are wound about the armature disk 36. Four such coils are shown in the drawings, but there may be a different number if desired. The coils 38, 39, 40 and 41 are wound within grooves 42 in the armature body, there being complementary grooves 43 in the Monel metal sleeve 37. Each coil 38, 39, 40 and 41 comprises a number of turns of wire 45 of high density current, the wire 45 being made of superconductive material. All but the outer or peripheral side 46 of the wire 45 is enclosed in a magnetic flux insulating tube 47 of superconductive material, but of low current density or no current at all. The coils are electrically insulated from one another and from the superconducting tube 47 by a Monel coating or other insulation which is effective for low temperature work.

The stator assembly 33 comprises a plurality of paramagnetic core units 50, 51, 52 and 53 surrounding the armature 31. Four core units are illustrated, but there may be a different number if desired.

Each core unit 50, 51, 52 and 53 has one pole 55, which may be the north pole, adjacent the path of travel of the bare wire portions 46 of the armature coils 45. Each core unit then continues in a loop, as shown in FIGURE 1, with either square or round corners, and has the opposite south pole 56 positioned adjacent the upper side of the armature 31 at a radially inward point near the shaft 32.

As shown in FIGURES 2 and 3, the core units 50, 51, 52 and 53 completely surround the shaft 32 and the armature 31. Thus, as the core units extend radially inwardly, they meet at vertical lines of intersection 58, 59, 60 and 61 and extend further inwardly in contact with one another along radial planes 62, 63, 64 and 65. As FIGURE 4 shows, the lines 58–61 of intersection between the core units are so positioned that the north poles 55 of the core units 50, 51, 52 and 53 surround the outer periphery of the armature 31 in essentially an unbroken ring. It is within this unbroken north pole ring that the uninsulated portions 46 of the armature coils 45 rotate. The south poles 56 of the core units 50–53 surround the shaft 32 in an unbroken ring (see FIGURE 2). In order to confine the flux in the stator cores 50–53, each may be surrounded by a superconducting sheath 66.

As shown in FIGURES 1 and 2, there are coils 68, 69, 70 and 71 wound around the outer legs of the core units 50, 51, 52 and 53, respectively. The coils 68–71 are made of wire of a superconductive material. They are wound in the same direction (e.g., all clockwise or all counterclockwise) about their core legs and may be joined together by wires 72, 73, 74 and 75 that connect all the coils in series.

There is a disk 78 of superconductive material fixed to the core units 50–53 and projecting inwardly above the top surface of the armature 31, as shown in FIGURE 1. The disk 78 carries either no current or is of very low current density, in which case it is electrically insulated from the core. Its inner side 79 is positioned near the south poles 56 of the stator core units 50–53. Thus, the disk 78 spans the space immediately above the armature between the stator poles 55 and 56.

Another disk 80 is fixed to the lower sides of the core units 50–53. The disk 80 is also of superconductive material and carries no current or is of low current density (in which case it is insulated from the stator cores). Its inner side 81 may be very close to the shaft 32.

The entire motor 30 is encased in an insulation housing 84 which is filled with liquid helium and is refrigerated to superconductive temperatures by means (not shown) known in the art. The liquid helium provides a medium for refrigerating to superconductive temperatures, and also is devoid of fluid friction at less than 2.2° K.

The shaft 32 is journaled in a par of magnetic bearings 86 and 87. Each bearing 86 and 87 comprises a disk 88 fastened to the shaft 32. The outer perimeter of each disk 88 has an enlarged bead 89 of generally circular cross section. Each bearing 86 and 87 also has an outer ring 90 pressfitted or otherwise permanently attached to the inner wall of the housing 84. (This ring is split horizontally into two sections so that the bead around the disk can be made to fit inside the ring.) The ring 90 has an annular recess 91 on its inner side, the diameter of which is greater than the diameter of the bead 89, as shown in FIGURE 1. The disk 88 is made of a low or no current carrying superconductor. The outer ring 90 is a superconductor carrying a current strong enough to create magnetic flux about it.

The motor 30 is entirely enclosed in the housing 84 because the motor must be kept refrigerated during its operation, as will be described hereinafter. If the shaft 32 were to extend through the housing 84, there would be a medium for considerable heat transfer through the housing 84, thus greatly increasing the required capacity of the refrigeration apparatus. To avoid this, the shaft is provided with a superconductive U-shaped magnet 94 fastened to it and wholly located within the housing 84. A shaft 95, connected to apparatus which is to use the power output from the motor, has a permanent magnet or magnetically attractive member 96 attached to it. As the shaft 32 rotates, the magnet or member 96 follows the rotation of the magnet 94 and imparts rotation to the shaft 95.

In FIGURES 5 and 6, a DC generator 120 is shown. In this generator 120, there is an insulating housing 121 which is completely closed. A rotary input shaft 122 extends through a wall of the housing 121. The rotary shaft 122 may be connected to any source of power to cause it to rotate. For example, it may be connected to the shaft 95 driven by the motor 30.

A disk 123 is fixed to the shaft 122. The outer perimeter 124 of the disk 123 is fixed to the inner sides of a plurality of magnetic cores 125. Each core 125 has two radially inward disposed poles 126 and 127 on opposite sides of the disk 123. A coil 129 is wound around each core 125 with links 130 connecting the coils 129 in series (or the coils may be individually wound). The coils 129 and wires 130 are superconductive material and electrically insulated. The poles of the cores 125 are uniform, e.g., all north poles are on one side of the disk 123 and all south poles are on the other side.

Another shaft 132 or other support is permanently anchored to the housing 121. For example, the shaft 132 may be fastened within a collar 133 which is fixed to the housing 121.

Another disk 134 is fastened to the end of the shaft 132. The disk 134 is parallel to and spaced from the disk 123. The outer perimeter 135 of the disk 134 is positioned just radially outward of the poles 126 and 127 on the cores 125.

There are a plurality of wire loops 137 which are electrically insulated from each other. The loops 137 are not superconductors but are made of materials that will conduct electrically at cryogenic temperatures. Each loop is formed as illustrated in FIGURE 7 with a bare wire side 138 and an opposite side enclosed in a magnetic flux insulating tube 139 of a superconductive material. The loops 137 are fastened to the disk 134 with the insulating tubes 139 fixed to the disk 134. The bare wire portions 138 are oriented in a radial direction about the shaft 132.

The bare wire portions 138 are also consistently oriented in either a clockwise or counterclockwise position relative to the insulating portion 139 as the generator is viewed from the top. The loops 137 may be connected in series or in parallel depending upon the current or voltage requirements. The leads are then connected to separate electrodes (not shown) from which the DC voltage is obtained.

While not illustrated in FIGURES 5 and 6, the shaft 122 may be mounted in magnetic bearings such as the bearings 86 and 87 illustrated in FIGURE 1. Also, the shaft 122 may be driven by a magnetic coupling, such as the magnets 94 and 96 as illustrated in FIGURE 1.

FIGURES 8–11 illustrate an alternate motor configuration. In this motor 150, there is an insulating housing 151 that completely encloses the operating parts of the motor. A shaft 152 extends through a wall of the housing 151. The shaft 152 is journaled in bearings (not shown), such as the magnetic bearings 86 and 87 illustrated in FIGURE 1. There is an electrically insulating sleeve 153 fastened to the shaft 152 with what may be called a magnetic flux pipe 154 pressfitted on its inner cylindrical wall 164 to the sleeve 153.

The flux pipe 154 is mounted on a core that includes a disk portion 155 of rectangular toroidal shape with an outer wall 156 and an inner wall 157. The core also has a dish-shaped portion 159 of slightly curved cross section extending upwardly from the rectangular toroid 155, as shown in FIGURE 8. The dish-shaped portion 159 terminates in a vertical outer edge 160. Below the vertical peripheral edge 160 of the portion 159, there are lines 161 which define the upper edges of downwardly extending slots terminating at the upper surfaces of the toroidal disk portion 155.

The flux pipe 154 is a casing of low current or no current superconductive material that encloses all but the vertical sides 156 and 160 of the core. Thus, it has top and bottom walls 162 and 163 and an inner wall 164 for covering the toroidal portion 155, and it has top and bottom walls 165 and 166 for covering the dish-shaped portion 159. The flux pipe 154 also has walls 167 for covering the slot between the lines 161 and the top of the toroidal portion 155. However, the top and bottom walls 162 and 163 of the flux pipe 154 have outer edges 168 and 168a that are positioned radially beyond the outer side 156 of the toroidal portion 155. There are holes 169 and 170 through the upper and lower walls 162 and 163. The holes 169 and 170 are radially aligned with the slots defined by the walls 167.

A plurality of turns of superconductive wire are wound through the holes 169 and 170 and around the toroidal portion 155 to define coils 173. The superconductive coils 173 are serially wound or separately wound around the toroidal portion 155. These superconductive coils are also wound on the outer surfaces of the flux pipe 154, as shown in FIGURE 8. Therefore, the coils 173 contact the core only along the outer wall 156, the coil being spaced from the core at other places by the superconductive flux pipe 154. The superconductive rotor coils 173 are electrically insulated from each other and the flux pipe 154.

The stator 178 is positioned around the rotor. The stator 178 comprises a plurality of magnetic cores 179, 180, 181 and 182. Each core 179–182 has two poles 183 and 184. One of the poles, say the south pole 183, is positioned opposite the exposed outer side 160 of the rotor core dish portion 159. The other poles 184 of the cores 179–182 extend between the upper and lower walls 162 and 163 of the flux pipe and are positioned opposite the exposed part of the coils 173. The cores 179–182 may be supported by the housing 151 by any means, such as by lateral rods 185.

There is a superconductive coil 186 wound around the side of each core 179–182. The superconductive coils 186 are wound in common directions about the cores, and they are joined together by wires 187 to connect them in series or separately, as is desired.

An optional modification of the superconductive coils that carry high current density, such as the coil 40 of FIGURE 1, is illustrated in FIGURE 12. This schematic section view shown has the same electrically insulated superconducting high current coil or coils 45 surrounded by the low current or no current superconductive magnetic flux insulating tube 47. However, in order to reduce the intensity of the magnetic flux trapped within the tube 47, a plurality of coils 190 are positioned longitudinally within the tube 47. The coils 190 are coated with suitable electrically insulating material. The coils 190 carry high current that creates a magnetic flux opposing that induced by the coils 45. Since the coils 190 do not extend alongside the exposed portions 46 of the coils 45, the motor torque is not affected.

FIGURES 13–16 illustrate an output control device for the motor of FIGURE 1. While these figures are schematic illustrations of the motor, it will be understood that the parts bearing numbers identical to those of FIGURE 1 have the same construction. Thus the general designation of the rotor 31 on the shaft 32 is intended to indicate that the rotor 31 has the same kind of coil windings on it as is illustrated in FIGURE 1, with such variations as are possible in the motor of FIGURE 1. One difference between the motor of FIGURE 13 and that of FIGURE 1, is that a no current or low current superconductive disk 200, corresponding to the disk 80 of FIGURE 1 is mounted directly on the shaft 32 to provide magnetic insulation. The outer periphery 201 of the disk is about coincident with the outer periphery of the rotor 31.

For the speed control of FIGURE 13, an outer core 202 is mounted along the outer side of each core unit 50, 51, 52, and 53. Each outer core 202 is made of a suitable magnetic flux concentrating material sheathed, except for the areas at each end, with a low current or no current superconductor and has an end face 203 aligned with the face of the pole 55 and an end face 204 aligned with the face of the pole 56.

For speed control in the other direction of rotation, another armature and surrounding stators are needed on the same shaft with the poles of the stators on the second armature arranged in opposite position with respect to those of the first stator. When the shaft is turning only one armature is producing torque at a given time. The inner stator cores may also be sheathed, except for their poles, with a superconductive material to better guide the path of the magnetic flux.

FIGURE 16 illustrates a gate 206. Two such gates are required for each inner stator core unit 50–53 (when there are four core units as in FIGURE 1). Each gate 206 comprises four individual panels 207, 208, 209, and 210. The panels 207, 208 and 210 are coplanar whereas the panel 209 projects at right angles to the panels 207, 208 and 210. The panels 207, 208, 209 and 210 are constructed of superconducting materials carrying low current or no current.

Two gates 206 are used for each outer core unit 202. The gates 206 are oriented as shown in FIGURES 13, 14 and 15. The gates 206 are suitably mounted, such as in channels (not shown) and suitable means are provided to shift them laterally, e.g., from the position shown in FIGURE 15 to a position in which the panels 210 and 207 are directly in front of the pole faces 55 and 203, and to intermediate positions therebetween. Such shifting means are not shown in the drawings.

FIGURE 17 illustrates another form of rotor coil that may be used with a motor as previously described. In this coil 220, there is a loop of wire 221 of high current density superconductive material. Ends 222 and 223 of the loop 221 are joined to a tube 224 of the same high current density superconductive material. The loop 221 and the tube 224 are electrically insulated with a suitable coating.

Inside the tube 224, there is another tube 225 of low or no current density superconductive material, also coated with electrically insulating material. The central portion 226 of the loop 221 passes through the inner tube 225. The inner tube 225 is used for magnetic insulation between the tube 224 and the wire portion 226 when the current density of the outer tube 224 is too high for such insulation.

The coil of FIGURE 17 may be used on a motor such as is partially shown in FIGURE 18, or on another motor such as is partially shown in FIGURE 19. The schematic drawing of FIGURE 18 shows part of a motor that may be made generally like the generator 120 illustrated in FIGURES 5 and 6. As such, the motor of FIGURE 18 has the outer core elements 125 which may be identical to those of FIGURES 5 and 6. The disk or plate 134 is mounted on the shaft 132 as shown in FIGURES 5 and 6. However, the coils 220 are substituted for the coils 137 which are illustrated in FIGURE 7. The coils 220 are oriented so that the tube 224 passes between the poles 126 and 127 (see FIGURE 6 for the location of these poles). The twisted wire portions at either end of the tube 224 serve to cancel flux in these portions of the wire loop 221. The coil in FIGURE 17 has the significant advantage of making it possible to construct a very simple, lightweight rotor.

FIGURE 19 incorporates a slight variation of the loop of FIGURE 17 into the motor of FIGURE 1. Here, the rotor coil 230 is substituted for the coils 45. In the construction of the coils 230 there are two tubes 231 and 232. The ends 233 and 234 of a wire loop 235 are joined to the tube 232 and pass through the tube 231. The ends 236 and 237 of another wire loop 238 are joined to the tube 231 and pass through the tube 232.

The tubes 231 and 232 are positioned as illustrated in FIGURE 19, opposite the poles 56 and 55, respectively. The wires 235 and 238, as well as the tubes 231 and 232, are electrically insulated from one another and carry a supercurrent of high current density. By providing current flow in each loop 235 and 238 opposite in direction to that of the other loop, motor torque can be produced at both the poles 55 and 56. To cancel out all magnetic flux except that about the two tubes, the wire of the loops can be twisted around one another.

Operation

Each of the enclosures 84, 121 and 151 contains liquid helium and each is refrigerated to superconducting temperatures for the superconducting materials employed. Refrigeration means for accomplishing this refrigeration are not shown in the drawings, but such refrigeration means are known in the art and their use is known in the art.

In the motor 30 illustrates in FIGURES 1-4, the stator coils 68, 69, 70 and 71 conduct current without resistance and continue to do so as long as the apparatus is kept refrigerated to superconducting temperature. This current in the stator coils generates lines of magnetic flux in the stator cores 50, 51, 52 and 53 as is conventional. Also, the rotor coils 45 conduct electricity so long as the superconductive temperatures prevail. When the magnetic flux from the north poles 55 of the stator cores 50–53 interacts with the flux at the rotor coils 45, the interaction occurs only at the uninsulated outer perimeter portions 46 of the rotor coils. The low current or no current density insulating tubes 47 insulate the rest of the coils 45 from the influence of the stator core magnetic lines of flux. As is normal, the current in the uninsulated portions 46 of the coils 45 produces flux which concentrates the stator core flux on one side of the rotor coils 45 producing torque to cause the rotor 31 to rotate.

Counter torque is virtually eliminated by the magnetic flux insulating tube 47 because lines of magnetic flux returning to stator south poles 56 cannot penetrate the portions of the rotor coils 45 adjacent to the stator poles 56. Also, the disks 78 and 80 which are of superconducting materials, provide magnetic flux insulation to concentrate the lines of magnetic flux into the path between them and therefore across the uninsulated portions 46 of the rotor coils 45.

As the rotor 31 rotates, it rotates the shaft 32 to which it is fastened. This causes the superconductive magnet 94 to rotate. Although the superconductive magnet 94 is entirely enclosed by the outer housing 84, the driven permanent magnet 96 outside the housing 84 is within the influence of the magnetic lines of flux from the superconductive magnet 94, and the driven shaft 95 is rotated as the magnet 96 follows the rotation of the magnet 94.

The bearings 86 and 87 reduce friction wille still supporting the shaft 32 for rotation. These bearings 86 and 87, which comprise the superconducting annular ribs 89 spaced from the recesses 91 in the high current superconducting rings 90, support the shaft 32 axially and laterally as it rotates. Since no parts are in mechanical connection or contact, the bearings 86 and 87 are virtually free of mechanical friction.

In the generator illustrated in FIGURES 5 and 6, the rotating shaft 122 causes the disk 123 to rotate, which in turn rotates the cores 125 connected to the outer perimeter 124 of the disk 123. Each of these cores 125 has high current carrying superconducting coils 129 wound around it, all being connected together in series or separately wound to establish flux in the cores 125. The flux in the cores 125 induces current in the exposed portions of the coils 138 to generate electricity. The coils 138 may be connected together in series or in parallel depending upon the desired output characteristics.

The motor shown in FIGURES 8–11 is a modification of the motor of FIGURE 1. The difference is primarily in the manner of providing magnetic flux insulation between the stator and rotor flux. In the motor 150, the low current or no current superconductive flux pipe 154 provides complete insulation between the flux in the stator cores 179, 180, 181 and 182 and the high current superconductive rotor coils 173, except for the outer peripheral portions of the coils 173 which extend across the outer periphery 156 of the rotor coil 173. The flux pipe 154 also has low current or no current superconductive plate extensions 168 and 168a on upper and lower sides of the poles 184 of the stator cores 179–182 to guide the flux in the path of the exposed portion of the rotor coils 173. Otherwise, torque is produced generally as described for the motor 30 of FIGURES 1–4.

The operation of the output control device of FIGURES 13–16 is as follows. When the device 206 is slid to the position illustrated in FIGURE 15, the panels 208 and 209 provide flux insulation between the pole 55 and the pole 203, and there is no magnetic flux insulating panel positioned between the pole 55 and the rotor 31. The gate 206 mounted adjacent the poles 56 and 204 is similarly positioned. The motor then operates as described in connection with FIGURE 1.

To cause the motor to stop, the gates 206 opposite the poles 55 and 56 are shifted. The gate 206 opposite the poles 55 and 203 is shifted so that the panels 210 and 207 are directly in front or opposite the poles 55 and 203. This positions the panels 208 and 209 to the right of the pole 203 as viewed in FIGURE 15. In this position of the gate, the flux insulating panels 210 and 207 block interaction of flux between the pole 55 and the rotor 31, but since there are no flux insulating panels between the poles 55 and 203, the flux can be concentrated in the outer core unit 202.

A similar position for the gate 206 relative to the poles 56 and 204 causes the motor to completely stop.

By shifting the gates 206 to selected intermediate positions, the output of the motor can be controlled to any desired level.

Various changes and modifications may be made within the purview of this invention as will be readily apparent to those skilled in the art. Such changes and modifications are within the scope and teaching of this invention as defined by the claims appended thereto.

What is claimed is:

1. A power device comprising a stator and a rotor, means to support the stator in a fixed position relative to the rotor, and means to support the rotor for rotation relative to the stator, the stator and rotor being disposed concentric with one another with one generally surrounding the other, the stator comprising a plurality of core elements with wire coils of super-conductive material wound around them, the rotor comprising a plurality of coils of superconductive material, the rotor coils having portions positioned adjacent a pole of the stator past which the rotor rotates, and means comprising superconductive material to provide magnetic flux insulation of all but the said portion of the rotor coils, the foregoing parts being housed in an insulating enclosure.

2. The device of claim 1 including means to control the output of the motor.

3. The device of claim 2 wherein the output control means comprises a plurality of cores separate from the stator core to provide an alternate flux path, and gate means having selectively positioned magnetically insulating panels of low current superconductive materials shiftable to control the amount of flux interaction from the stator cores to the rotor and separate cores.

4. The combination of claim 1 wherein the means supporting the rotor comprises a shaft, a superconductive magnet inside the enclosure mounted on the shaft, the superconductive magnet being positioned adjacent a wall of the enclosure, and another shaft adapted to be driven by the rotating motion of the rotor shaft the last-named shaft having a magnetic flux concentrating material mounted on it with its poles positioned adjacent the said wall of the enclosure within the influence of magnetic flux from the first-named superconductive magnet.

5. The power device of claim 1 wherein the means for supporting the rotor comprises a shaft, a pair of disks mounted on opposite ends of the shaft on opposite sides of the rotor, at least the outer edges of the disks comprising a superconductive material carrying low or no current, a ring of superconducting material carrying high current fixed to the housing enclosure corresponding to each disk, each ring having an annular recess within which the outer perimeter of the disk is positioned, the recess and the outer perimeter of the disk being so sized and shaped that the perimeter of the disk is spaced from the wall defining the recess.

6. A power device comprising an insulating enclosure, a shaft rotatably supported by the enclosure, a rotor mounted on the shaft, a stator supported by the enclosure, the stator comprising a plurality of magnetic cores having coil windings wound about them, the coil windings comprising superconductive material wires, the rotor including wire windings of superconductive material, and means to provide magnetic flux insulation of portions of the rotor coils so that magnetic flux in the rotor coils can react with magnetic flux in the stator cores in only the portions of the rotor coils which are uninsulated against magnetic flux.

7. The power device of claim 6 wherein the rotor includes a magnetic core having vertically spaced ends, means providing walls covering all the rotor core except the pole surfaces, the last-named means comprising a superconductive material carrying a minimum current, the stator cores having poles being positioned opposite a portion of the rotor coils, the last-named portions being received in opposing walls of the magnetic flux insulating material.

8. The combination of claim 6 wherein the power device is a generator and the rotor comprises a disk and the cores fastened to the outer perimeter of the disk, the rotor coils being wound on the rotor cores.

9. The power device of claim 6 wherein the rotor comprises a disk and the rotor coils comprise a plurality of partially flux shielded superconductive loops mounted upon the disk, and the stator cores have poles positioned above the superconductive loops.

10. Power apparatus comprising an insulating enclosure, a rotor and a stator assembly within the enclosure, the stator assembly comprising a plurality of core elements having poles disposed generally in a circle, the rotor being positioned within the thus defined circle and comprising a plurality of wound coils, the coils being of superconductive material carrying high current density when the apparatus is refrigerated to superconductive temperatures, the core elements also having opposite poles positioned radially inwardly from the first-named poles, and superconductive material of low current or no current density around the rotor coils insulating all but the outer peripheral portions thereof from the stator flux.

11. The apparatus of claim 10 wherein the superconductive material comprises a flux pipe having portions extending above and below the first-named poles of the stator core unit for guiding the stator flux into the areas of interaction with the magnetic flux produced by the exposed portions of the rotor coils.

12. Power apparatus comprising an insulating enclosure, a rotor and stator assembly within the enclosure, the stator assembly comprising a plurality of core elements having poles disposed generally in a circle, the rotor comprising a plurality of wound coils of superconductive material carrying high current density when the apparatus is refrigerated to superconductive temperatures, the rotor coils being positioned in concentricity with the poles of the stator core elements, each rotor coil comprising a tube having the ends of a wire loop connected to it, and means to reduce the influence of flux in the wire loop portions of the coil upon the flux at the stator element poles, the coils being positioned with the tube portions located to pass near the stator element poles as the rotor rotates relative to the stator.

13. The power apparatus of claim 12 wherein the core elements have additional magnetic poles positioned radially inwardly from the first-named poles, the rotor being positioned within the circle defined by the first-named poles of the stator core elements, the rotor coils each comprising an additional tube positioned adjacent the last-named stator poles as the rotor rotates, and including an additional wire loop having its ends connected to the last-named tube, the direction of current flow through the tubes of each coil being opposite.

14. In a power device having relatively rotatable stator and rotor elements with magnetic flux interaction between them produced by superconductive windings made from superconductive materials, a shaft for the rotor, a pair of disks mounted in spaced relation on the shaft, at least the outer edges of the disks comprising a superconductive material, a pair of rings of superconductive material, means to support the rings in fixed positions concentric with the disks, each ring having an annular recess within which the outer perimeter of the adjacent disk is positioned, the recess in the outer perimeter of the disk being so sized and shaped that the perimeter of the disk is spaced from the wall defining the recess, the disk and ring being held in constant spaced relation by virtue of a high current density in one and a low current density in the other as the disk rotates relative to the ring.

15. Power apparatus comprising an insulating enclosure, a rotor and stator assembly within the enclosure, the stator assembly comprising a plurality of core elements having first poles disposed generally in a circle and second poles disposed generally in a circle, the rotor being positioned within the circle defined by the first poles, the second poles being positioned radially inward of the first poles and being positioned adjacent a side of the rotor, the rotor comprising a plurality of coil units, each coil unit comprising a first hollow tube of high current density superconducting material having the ends of a first wire loop connected to it and a second hollow tube of high current density superconducting material having the ends of a second wire loop connected to it, the wire loops being of high current density superconducting material, a central portion of the first wire loop extending through the second hollow tube, a central portion of the second wire loop extending through the first hollow tube, the direction of current flow through the first tube and loop being opposite to that of the second tube and loop, the first tube being positioned to pass near the first poles and the second tube being positioned to pass near the second poles as the rotor rotates.

16. The power apparatus of claim 13 wherein the portions of wires outside the tubes are twisted to cancel their magnetic flux.

References Cited
UNITED STATES PATENTS

| | | | |
|---|---|---|---|
| 3,277,322 | 10/1966 | Berlincourt | 310—40 |
| 3,292,021 | 12/1966 | Hoag | 310—40 |

DAVID X. SLINEY, Primary Examiner

U.S. Cl. X.R.

310—40, 52